United States Patent Office 2,821,151
Patented Jan. 28, 1958

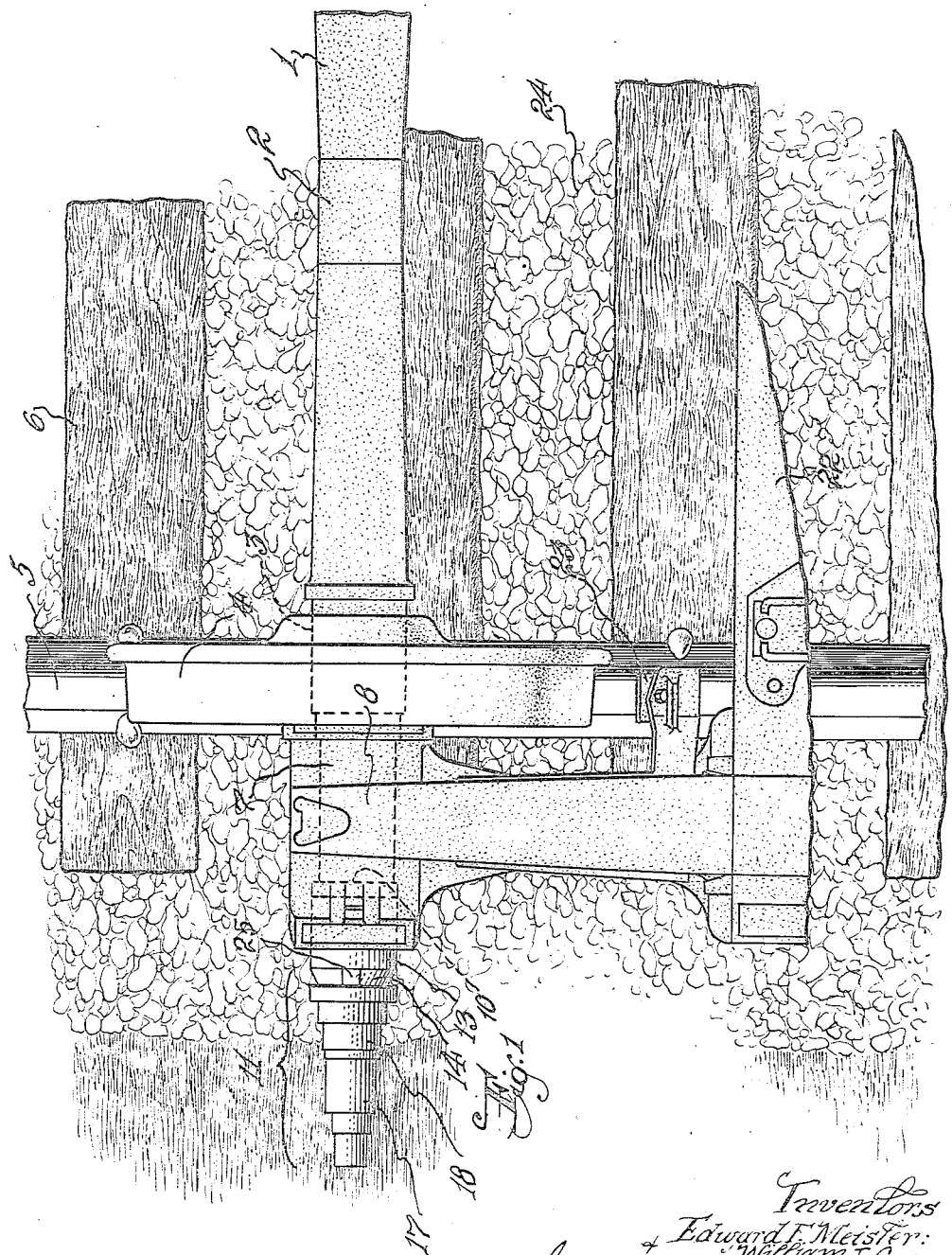

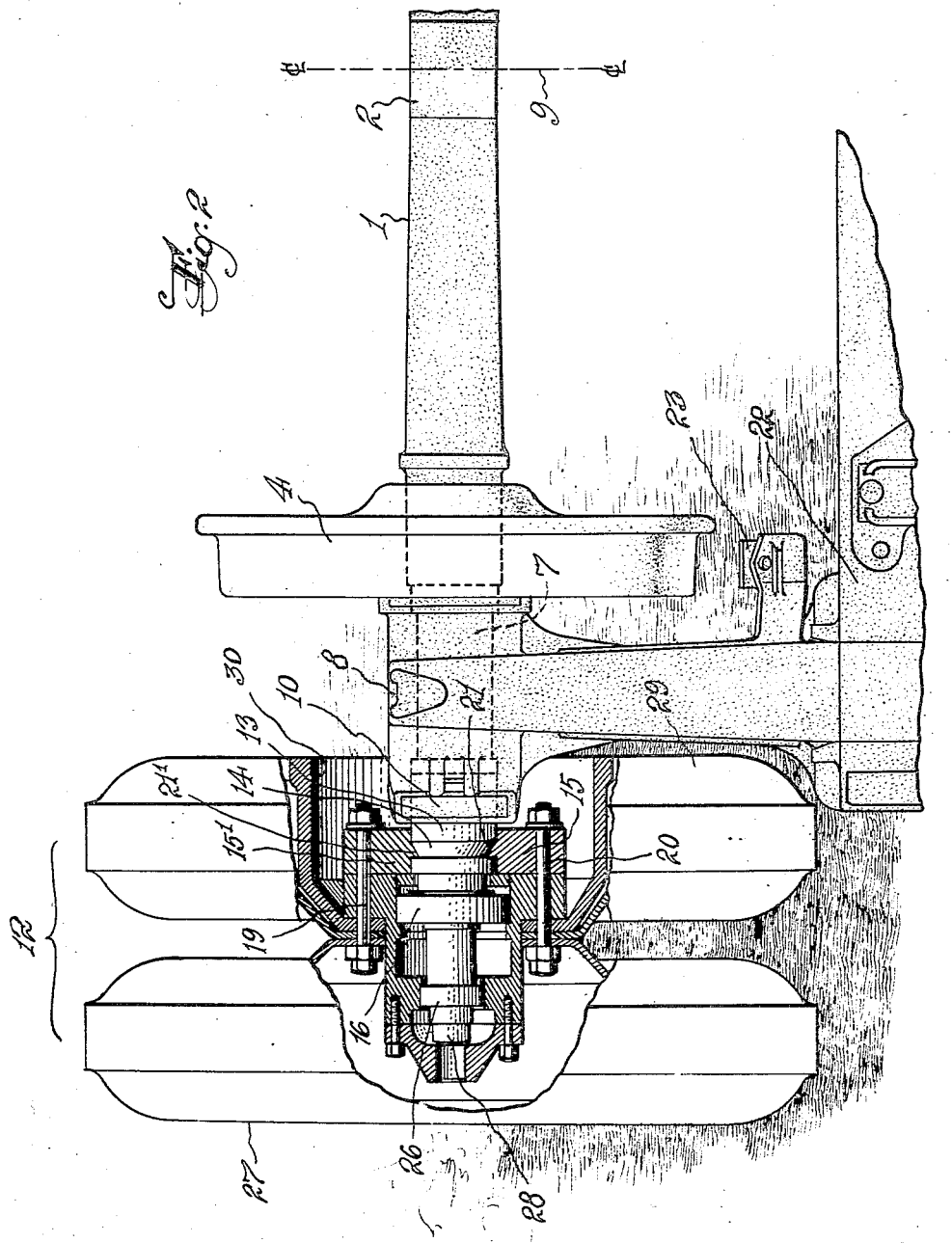

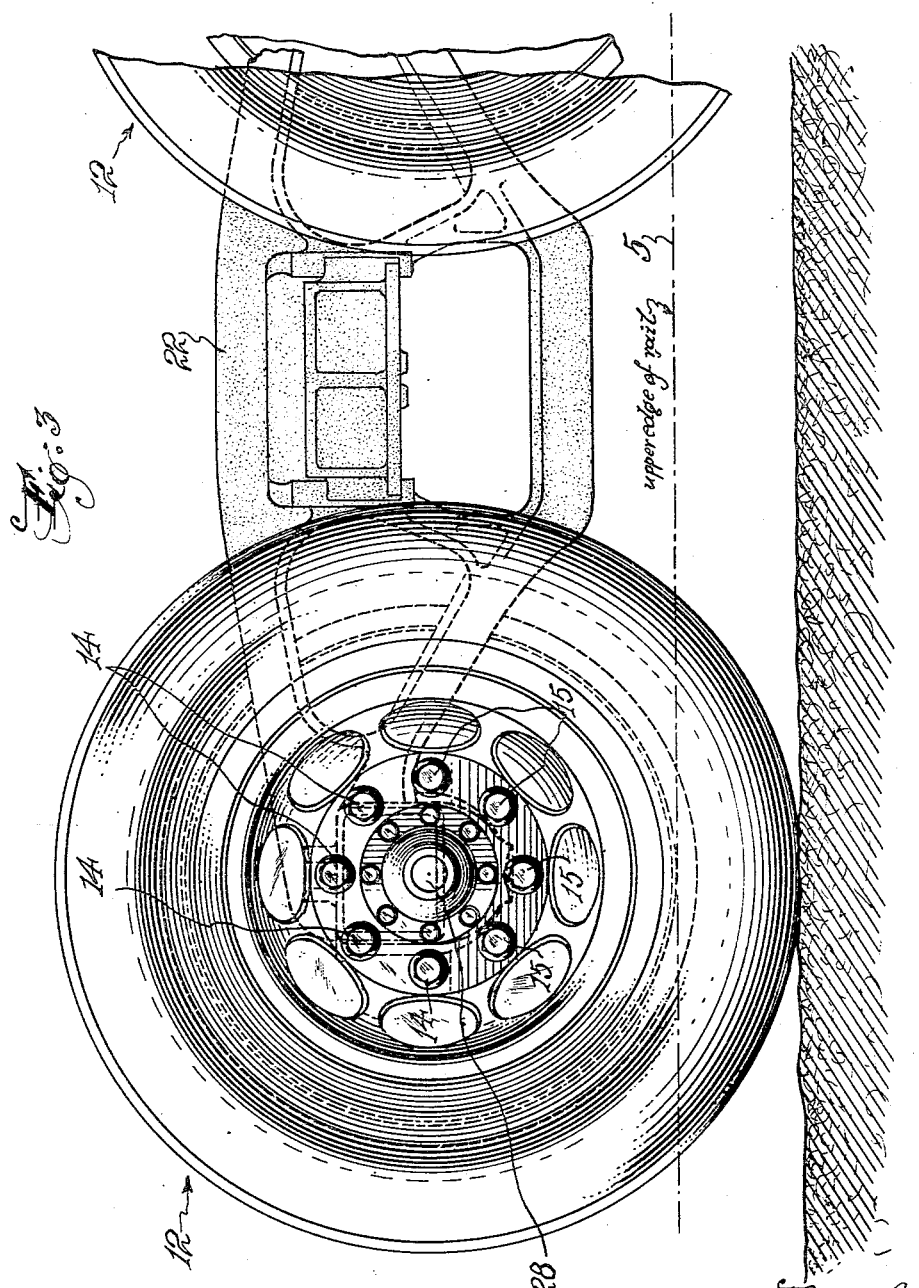

2,821,151

COMBINED HIGHWAY-RAILROAD AXLE AND WHEEL SYSTEM

Edward F. Meister, Elizabeth, and William J. Corr, Plainfield, N. J.

Application March 9, 1954, Serial No. 414,963

2 Claims. (Cl. 105—215)

This invention deals with a railroad car axle adaptable for highway use and also to automotive-type wheels usable therewith. More specifically, it relates to a railroad car axle having a projection past the journal on which may be readily mounted automotive truck-type wheels adapted to enable the railroad car to be moved over highways without damage to the highways.

Railroads have been suffering from inroads on their business caused by large trucks and trailers transported over highways. Railroads also have the disadvantage that their rolling stock cannot be moved elsewhere other than where railroad tracks are laid, and such right-of-ways are not only expensive to build, but also are expensive to maintain.

The present invention involves the object of enabling rail cars to be moved over highways to non-rail serviced areas. This is accomplished by employing a railroad car axle which has extensions on its ends projecting through the stuffing box area and serving as axles for truck-type wheels when it is desired to transport the cars on the highways.

The invention will be more readily understood by reference to the accompanying drawings in which Figure 1 depicts a plan view of a portion of a preferred type of axle carrying a conventional railroad wheel on a track, as well as a portion of the railroad truck carrying the journal. Figure 2 shows a similar view of the axle with highway truck-type tires (depicted partly in cross-section), mounted thereon. A side view of the unit shown in Figure 2 is illustrated in Figure 3. Similar numerals refer to similar parts in the various figures.

Referring again to the drawings, numeral 1 represents a conventional type railroad axle on which is mounted a conventional steel railroad wheel 4. Central section 2 of the axle in Figure 2 has center line 9 to denote the middle portion of the axle 1 which has journal 7 projecting into journal box 8. A stuffing box 10, which is shorter than the conventional stuffing box is used if roller type bearings are not employed for the bearing surface. Projection 11 (Figure 1) past the journal is the projection of axle 1 on which are mounted the highway truck type wheels 12 (Figure 2).

It will be observed that the heaviest projection 13 of the axle has a circumferential cut out or groove portion 14 into which are locked split flanges 15 and 15', serving to hold wheels 12 onto axle 1. Bearings 26 and 16 of wheels 12 ride on bearing surfaces 17 and 18 of axle 1 and they may be of the roller type. The axle projections 11 diminish in size as they are disposed farther away from the center of axle 1, so as to make it convenient to attach wheels 12 which can be slipped over projection 11 and fastened to the axle by bolting on upper split flange 15' to the wheels by means of upper bolts 19, and bolting lower split flange 15 to the wheels by means of lower bolts 20. This is done after moving the cars to be provided with the automotive wheels onto a track having space at the side to allow the automotive wheels 12 to be mounted directly on the axle as it stands on the rails. It will be observed that these wheels are larger in diameter than railroad wheels 4 to prevent any possibility of the railroad wheels touching the highway surface over which they may be transported. Flanges 15 and 15' have projecting lips 21 and 21' respectively which lock into groove 10 and serve to keep wheels 12 securely on axle 1. Extension 11 is short enough to not contact anything along the track right-of-way and it may be covered when not in use by a sponge rubber or other type of cover. If wheels 12 are not to rotate on axle extension 11, a locking section 25 or an equivalent locking means is provided in groove 14.

It will be noted also that railroad truck 22, which carries journal box 8, also carries conventional brake shoes 23 for braking steel wheels 4 in the conventional manner. Track 5 is laid on conventional ties 6 placed on a conventional roadbed 24.

When in operation, the railroad truck and axle are disposed on the track as shown in Figure 1. When the railroad car is to be transported by highway, wheels 12 are mounted on axle extension 11 and lock onto axle 1 by split flanges 15 and 15'. Thereafter, when all of the automotive type wheels 12 are attached to axle ends 11, a truck cab is coupled to the railroad car and the air hose from the cab is connected to the air hose of brake shoes 23, thereby enabling the driver in the cab to apply the brakes to railroad wheels 4. Then, the car is moved over an inclined plane until all wheels are clear of the tracks, and is driven off the tracks onto the highway. The same operation is used in reverse to position the car back onto the rails. Obviously, the axles on which brakes are to be applied have their automotive type wheels locked onto the axle by a locking section 25 in groove 14 (Figure 1), with a complementary portion cut out in flanges 15 and 15', so that wheels 12 will not rotate on axle projection 11.

It will be noted that outer surface 27 of wheels 12 (Figure 2) does not extend very much beyond end 28 of axle extension 11. This is due mainly to the fact that inner wheel edges 29 is disposed very close to car truck 22 because of the deep recessing of hub 30 of wheels 12.

It is to be understood that extension 11 is an integral part of axle 1 and is not a portion added on thereto as a separate unit.

Although the preferred embodiment described is directed to a conventional solid railroad axle, it is to be understood that this invention is not limited thereby and may be employed for other type railroad axles, such as tubular types and the like.

The holding device depicted herein and involving the split flange means is merely shown as an example of such devices, and other holding or locking means known in the art may be employed.

The present axle and wheel system make it possible to move, without great difficulty, on the highways, the usually cumbersome freight and other railroad cars now restricted to railroad use.

We claim:

1. In a railroad axle assembly designed to carry a highway truck type wheel hub and comprising a rotatable axle, a railroad wheel fixed to the axle near each end thereof, a railroad truck side member carrying a journal box and a journal on said axle rotatable in said box, said journal being adjacently disposed outside of each wheel, the improvement comprising an axial extension projecting outwardly from the axle journal adjacent each wheel, complementary holding means disposed on each extension, and a removable highway truck type wheel hub having holding means coacting with the holding means on the extension to hold said hub on said extension.

2. In a railroad axle assembly designed to carry a highway truck type wheel and comprising a rotatable railroad axle, a railroad wheel fixed to the axle near each end thereof, a railroad truck side member carrying a journal box and a journal on said axle rotatable in said box, said journal being adjacently disposed outside each wheel, the improvement comprising an axial extension projecting outwardly from the axle journal adjacent each wheel, complementary holding means disposed on each extension, and a removable highway type truck wheel of overall diameter larger than that of the railroad wheel and having holding means coacting with the holding means on the extension to hold said wheel on said extension.

References Cited in the file of this patent

UNITED STATES PATENTS

| | | |
|---|---|---|
| 1,709,248 | De Ybarrondo | Apr. 16, 1929 |
| 1,807,793 | Moore | June 2, 1931 |
| 2,042,265 | Main | May 26, 1936 |
| 2,061,298 | Adair | Nov. 17, 1936 |
| 2,066,836 | Hughes | Jan. 5, 1937 |
| 2,135,307 | Keator | Nov. 1, 1938 |
| 2,263,578 | Hickman | Nov. 25, 1941 |

FOREIGN PATENTS

| | | |
|---|---|---|
| 788,589 | France | July 29, 1935 |
| 314,212 | Germany | Sept. 8, 1919 |
| 331,913 | Great Britain | July 11, 1930 |